United States Patent
Zhang et al.

(10) Patent No.: US 11,762,116 B2
(45) Date of Patent: Sep. 19, 2023

(54) SYSTEM AND METHOD OF HYDROCARBON DETECTION USING NONLINEAR MODEL FREQUENCY SLOPE

(71) Applicant: SAUDI ARABIAN OIL COMPANY, Dhahran (SA)

(72) Inventors: Si-Hai Zhang, Dhahran (SA); Weihua Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 250 days.

(21) Appl. No.: 17/205,615

(22) Filed: Mar. 18, 2021

(65) Prior Publication Data
US 2022/0298908 A1  Sep. 22, 2022

(51) Int. Cl.
*G01V 1/40* (2006.01)
*E21B 7/04* (2006.01)
*G01V 1/30* (2006.01)

(52) U.S. Cl.
CPC .............. *G01V 1/40* (2013.01); *E21B 7/04* (2013.01); *G01V 1/302* (2013.01); *G01V 1/306* (2013.01); *G01V 1/307* (2013.01)

(58) Field of Classification Search
CPC .......... G01V 1/40; G01V 1/302; G01V 1/306; G01V 1/307; G01V 1/32; G01V 2210/43; G01V 2210/64; G01V 1/50; E21B 7/04
See application file for complete search history.

(56) References Cited

U.S. PATENT DOCUMENTS

| | | | |
|---|---|---|---|
| 6,131,071 A | 10/2000 | Partyka et al. | |
| 6,473,695 B1 | 10/2002 | Chutov et al. | |
| 7,243,029 B2 | 7/2007 | Lichman et al. | |

(Continued)

FOREIGN PATENT DOCUMENTS

| | | |
|---|---|---|
| CN | 102692647 A | 9/2012 |
| CN | 103353610 A | 10/2013 |

(Continued)

OTHER PUBLICATIONS

International Search Report and Written Opinion issued in corresponding International Patent Application No. PCT/US2022/020997, dated Jun. 9, 2022 (19 pages).

(Continued)

*Primary Examiner* — Daniel Pihulic
(74) *Attorney, Agent, or Firm* — Osha Bergman Watanabe & Burton LLP

(57) ABSTRACT

A method is disclosed that includes: obtaining a seismic data volume for a subterranean region of interest; transforming, by a computer processor using a non-stationary series analysis, the seismic data volume into a seismic spectral volume where the seismic spectral volume includes a seismic spectrum for each of a plurality of voxels; and determining a seismic attribute volume composed of a seismic attribute for each of the plurality of voxels. The seismic attribute for a voxel of the plurality of voxels is based, at least in part, on an integral of the seismic spectrum for the voxel over a range bounded by a first frequency and a second frequency. The method further includes determining a presence of hydrocarbon in the subterranean region of interest based on the seismic attribute volume. A system for performing the method is also disclosed and described.

20 Claims, 6 Drawing Sheets

(56) References Cited

U.S. PATENT DOCUMENTS

| | | |
|---|---|---|
| 7,729,862 B2 | 6/2010 | Dewarrat |
| 7,876,643 B2 | 1/2011 | Wiley et al. |
| 9,551,799 B2 | 1/2017 | Wiley et al. |
| 2007/0299614 A1 | 12/2007 | Dewarrat |
| 2012/0090834 A1 | 4/2012 | Imhof et al. |
| 2013/0238247 A1 | 9/2013 | Wiley et al. |
| 2020/0333488 A1 | 10/2020 | Zhang et al. |
| 2022/0298908 A1 * | 9/2022 | Zhang .................. G01V 1/307 |

FOREIGN PATENT DOCUMENTS

| | | |
|---|---|---|
| CN | 104330824 A | 2/2015 |
| CN | 104360382 A | 2/2015 |
| CN | 104516019 A | 4/2015 |
| CN | 108469633 A | 8/2018 |
| CN | 110554428 A | 12/2019 |
| CN | 110967749 A | 4/2020 |
| WO | WO-2022198075 A1 * | 9/2022 ............. E21B 44/02 |

OTHER PUBLICATIONS

Thirion et al., "Wavelet Transform: Application to Acoustic Logging", Oil & Gas Science & Technology: Revue de l'Institut Francais du Petrole, Editions Technip Paris, FR, vol. 49, No. 2, pp. 149-163, 1994 (15 pages).

Dilay, Andrew and John Eastwood, "Spectral analysis applied to seismic monitoring of thermal recovery", The Leading Edge, American Geological Institute, vol. 14, No. 11, Nov. 1995, pp. 1117-1122 (6 pages).

* cited by examiner

SYSTEM AND METHOD OF HYDROCARBON DETECTION USING NONLINEAR MODEL FREQUENCY SLOPE

BACKGROUND

In some situations, a portion of a reservoir within a subterranean region of interest may contain a hydrocarbon deposit and a portion of the reservoir may contain fresh water or brine. In some situations, it may be desirable to detect the presence and location of the hydrocarbon deposit using a seismic survey. Portions of the reservoir containing a hydrocarbon deposit may affect the characteristics of the reflected seismic waves in a different manner than portions of the reservoir containing fresh water or brine. In some situations, it may be desirable to drill a wellbore into a hydrocarbon deposit to produce the hydrocarbon to the surface. Such a wellbore may be a vertical wellbore, a deviated wellbore, or a horizontal wellbore constructed using geosteering methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method is disclosed that includes: obtaining a seismic data volume for a subterranean region of interest; transforming, by a computer processor using a non-stationary series analysis, the seismic data volume into a seismic spectral volume where the seismic spectral volume includes a seismic spectrum for each of a plurality of voxels; and determining a seismic attribute volume composed of a seismic attribute for each of the plurality of voxels. The seismic attribute for a voxel of the plurality of voxels is based, at least in part, on an integral of the seismic spectrum for the voxel over a range bounded by a first frequency and a second frequency. The method further includes determining a presence of hydrocarbon in the subterranean region of interest based on the seismic attribute volume.

In general, in one aspect, embodiments relate to a non-transitory computer readable medium storing instructions executable by a computer processor, the instructions including functionality for obtaining a seismic data volume for a subterranean region of interest, transforming, using a non-stationary series analysis, the seismic data volume into a seismic spectral volume comprising a seismic spectrum for each of the plurality of voxels, and determining a seismic attribute volume composed of a seismic attribute for each of the plurality of voxels. The seismic attribute for a voxel of the plurality of voxels is based, at least in part, on an integral of the seismic spectrum for the voxel over a range bounded by a first frequency and a second frequency; The method further including determining a presence of hydrocarbon in the subterranean region of interest based on the seismic attribute volume.

In general, in one aspect, embodiments relate to a system for determining the presence of hydrocarbon including a seismic source to emit a radiated seismic wave, a plurality of seismic receivers for detecting and recording a multi-dimensional seismic data set generated by the radiated seismic wave, and a seismic processor. The seismic processor being configured for obtaining a seismic data volume for a subterranean region of interest, transforming, using a non-stationary series analysis, the seismic data volume into a seismic spectral volume comprising a seismic spectrum for each of the plurality of voxels, and determining a seismic attribute volume composed of a seismic attribute for each of the plurality of voxels. The seismic attribute for a voxel of the plurality of voxels is based, at least in part, on an integral of the seismic spectrum for the voxel over a range bounded by a first frequency and a second frequency. The method further including determining a presence of hydrocarbon in the subterranean region of interest based on the seismic attribute volume.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following describes systems and methods to improve seismic methods of gas detection. Seismic wave propagation theory indicates that a geological formation containing gas causes attenuation of the amplitude and energy in seismic waves passing through the formation, particularly in the high-frequency components of the waves. Based on this finding, high-frequency attenuation of seismic waves can be used to detect gas deposits. One way of detecting high frequency attenuation is by generating a frequency spectrum of the seismic data. However, because frequency-dependent attenuation is caused by different variables, merely analyzing the frequency spectrum for attenuated portions does not reliably indicate the presence of gas. An accurate and reliable method for detecting gas using frequency-dependent attenuation is desired.

Embodiments disclosed herein are generally related to methods employing the determination of seismic spectral decay with increasing frequency of seismic reflection data for the detection and characterization of hydrocarbon deposits, especially gas, in subterranean regions. Further, embodiments disclosed herein describe the planning of the location of borehole drilling and the trajectory of boreholes to produce the hydrocarbon to the surface based upon the location and characteristics of hydrocarbon deposits.

Figure 1:
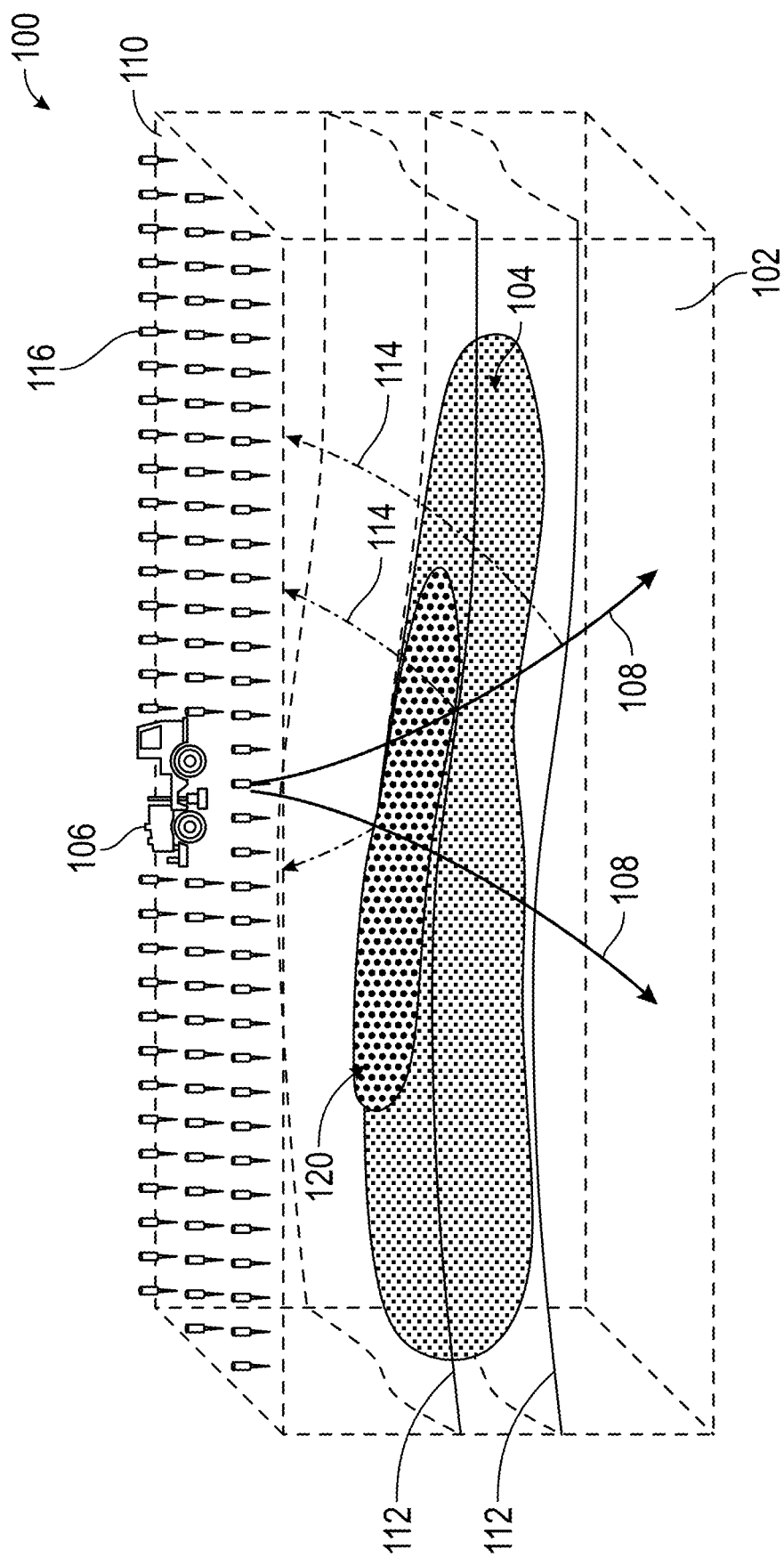
FIG. 1 depicts a seismic survey in accordance with one or more embodiments.

FIG. 1 shows a seismic survey (100) of a subterranean region of interest (102), which may contain at least one subsurface formation interface (112). The seismic survey (100) may utilize a seismic source at a plurality of seismic source locations (106) on the Earth's surface (110) that radiates a plurality of seismic waves (108). The plurality of seismic waves (108) may be reflected from subsurface formation interfaces (112) and return to the Earth's surface (110) as a plurality of reflected seismic waves (114). The plurality of reflected seismic wave (114) may be detected at the Earth's surface (116) by a plurality of seismic receivers (116).

The subterranean region of interest (102) may contain a hydrocarbon reservoir (104) that may include a gas deposit (120). The radiated seismic waves (108) and reflected seismic waves (114) may traverse the hydrocarbon reservoir (104) including the gas deposit (120). In addition, reflected seismic waves (114) may be generated when the radiated seismic waves (108) impinge on the hydrocarbon reservoir (104) and gas the gas deposit (120).

The seismic data recorded by the plurality of seismic receivers (116) is made up of individual receiver readings referred to as "traces." Each data point in a trace corresponds to a ground motion recorded by the seismic receiver (116) at a recording time elapsed after the activation of the seismic source (106). In accordance with one or more embodiments, in order to generate a three-dimensional seismic data volume from the recorded seismic data, a plurality of traces are summed or "stacked".

In addition to stacking the traces, the traces may be transformed from the time domain to the depth domain by transforming the recording time of a data point in a trace to a depth at which the reflected seismic wave (114) was generated. After this transformation each data point in a trace corresponds to a ground motion produced by a reflected seismic wave (114) generated at a particular depth in the subterranean region of interest. Furthermore, traces may be combined to determine the lateral position in the subterranean region of interest at which a reflected seismic wave (114) is generated using a process called "migration." The order in which the processes of stacking, time-to-depth transformation, and migration are performed may differ from one embodiment to another. Furthermore, some of the processes, e.g., migration, may be omitted. However, a three-dimensional (3D) seismic data volume produced by any combination of one or more of these processes provides a 3D map of the subterranean region of interest.

Figure 2:
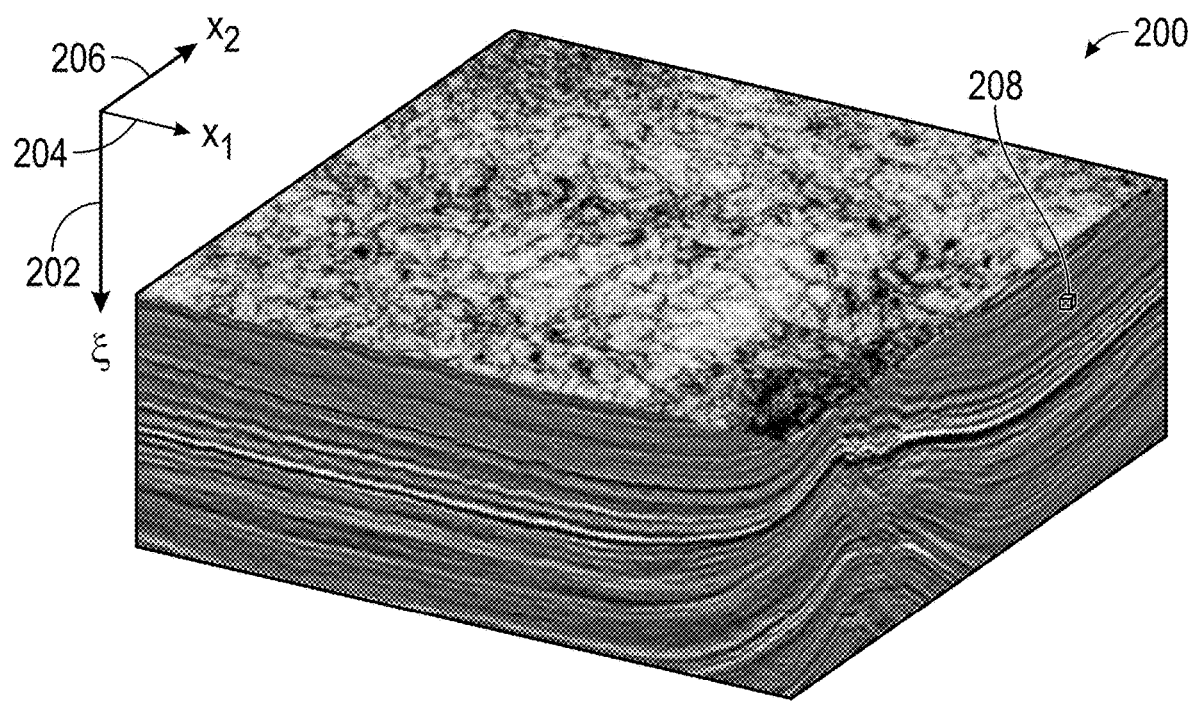
FIG. 2 shows a 3D seismic data volume in accordance with one or more embodiments.

FIG. 2 shows sections through a 3D seismic data volume (200) in accordance with one or more embodiments. The vertical axis (202) labelled $\xi$, may in some embodiments be a time axis and in other embodiments a depth axis. The horizontal axis (204) marked $x_1$ and the horizontal axis (206) marked $x_2$ may be orthogonal axes on the Earth's surface (110), e.g., the North-South axis and the East-West axis. FIG. 2 depicts a horizontal slice (212) and a vertical slice (210) through each voxel (208) within the seismic data volume (200) displays the amplitude of the reflected seismic wave (114) generated at the location of the voxel (208), encoded by a shade on a grayscale or a color scale (not shown).

In accordance with one or more embodiments, the 3D seismic data volume (200) shown in FIG. 2 may be a common-midpoint time-domain stack volume or a common-midpoint depth-domain stack volume, where the traces are stacked but not migrated. In accordance with other embodiments, the 3D seismic data volume (200) may be a post-stack time-migration volume or a post-stack depth-migration volume, where in both cases the migration is performed after the stacking. According to still further embodiments, the 3D seismic data volume (200) may be a pre-stack time-migration volume or a pre-stack depth-migration volume, where in both cases the migration is performed before the stacking.

In accordance with one or more embodiments, the 3D seismic data volume may be transformed into a 3D spectral data volume using f-frequency analysis. The $\xi$-frequency analysis may be time-frequency analysis if the $\xi$-axis (202) is a time axis or the $\xi$-frequency analysis may be depth-frequency analysis if the $\xi$-axis (202) is a depth axis. In both cases $\xi$-frequency analysis differs from $\xi$-frequency decomposition because the spectral content of the 3D seismic data volume varies with $\xi$. $\xi$-frequency analysis is also referred to as non-stationary series analysis.

In accordance with one or more embodiments, $\xi$-frequency analysis may be performed by applying a Gabor transform along the $\xi$-axis of the 3D seismic volume (200). According to other embodiments, this transformation may be performed by applying a Short Time Fourier Transform (STFT) to characterize the $\xi$-frequency response. Alternatively, the $\xi$-frequency analysis may be performed by applying a Discrete Wavelet transform along the $\xi$-axis of the 3D seismic volume (200).

In accordance with one or more embodiments, the $\xi$-frequency analysis may be performed using a continuous wavelet transform (CWT) of the seismic data volume. The CWT uses a wavelet to investigate the frequency characteristics of the seismic data volume, $A(\xi,x)$, where $x=(x_1,x_2)$ is the vector of horizontal location coordinates. In particular, the CWT compares $A(\xi,x)$ to shifted and stretched or compressed versions of the wavelet. The CWT is defined as the inner product of a family of wavelets, $\varphi_{\sigma,\eta}(\xi)$, and the seismic data volume $A(\xi,x)$:

$$w(\sigma, \eta, x) = \langle A(\xi, x), \varphi_{\sigma,\eta}(\xi) \rangle = \int_{-\infty}^{\infty} A(\xi, x) \frac{1}{\sqrt{\sigma}} \overline{\varphi}\left(\frac{\xi - \eta}{\sigma}\right) d\xi \quad \text{Equation (1)}$$

where $\sigma, \eta \in \Re$ and $\sigma > 0$. In equation (1), $\overline{\varphi}$ is the complex conjugate of $\varphi$, $\sigma$ is a scaling factor, and $\eta$ is a shifting factor along the $\xi$-axis. Example wavelets used by the CWT include Complex Ricker wavelet, FBSP, Morlet, Shannon, and modified Morlet wavelets.

The seismic volume $w(\sigma,\eta,x)$ does not directly provide $\xi$-frequency analysis of the 3D seismic volume $A(\xi,x)$. To overcome this deficiency, the $w(\sigma,\eta,x)$ may be converted into a seismic spectral volume, $S(f,\eta,x)$, using the central frequency of the wavelet $\varphi_{\sigma,\eta}(\xi)$ to map the scaling factor σ to the ξ-frequency, f.

Figure 3:
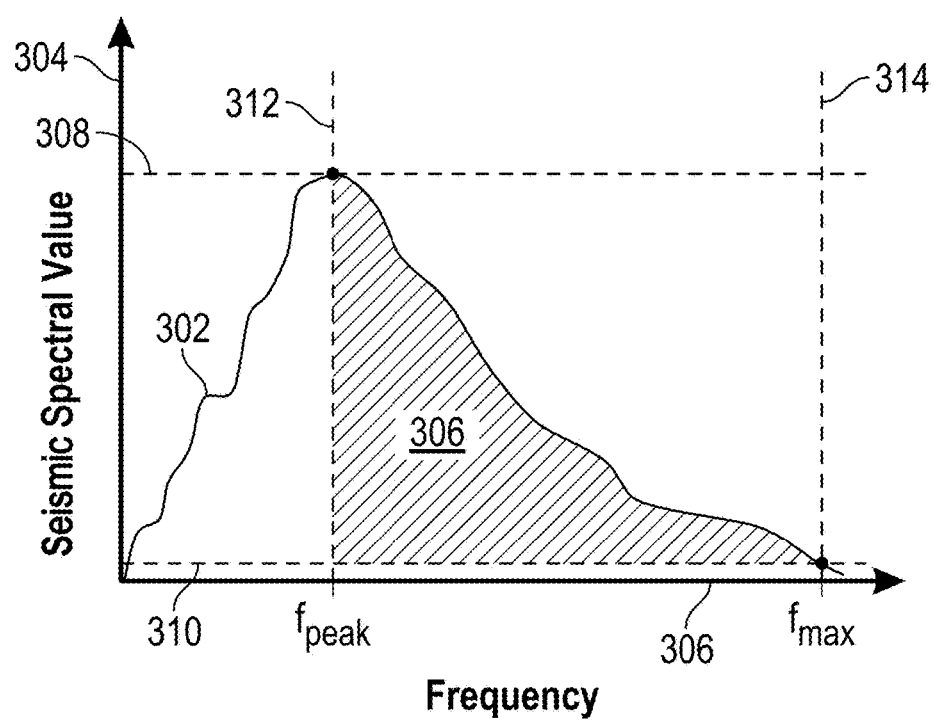
FIG. 3 depicts a frequency spectrum in accordance with one or more embodiments.

FIG. 3 shows a seismic spectrum $S(f,\eta,x)$ for a single voxel, in accordance with one or more embodiments. A seismic spectrum comprises a seismic spectral value (304) for a plurality of frequencies. The seismic spectrum may be an amplitude spectrum, in which case the magnitude of the seismic spectrum represents the amplitude of the seismic spectrum at each of a plurality of ξ-frequencies. Alternatively, the seismic spectrum may be a power spectrum, in which case the magnitude of the seismic spectrum represents the power of the seismic spectrum at each of a plurality of ξ-frequencies. Whether the seismic spectrum is an amplitude spectrum or a power spectrum the ξ-frequencies may be a temporal frequency if ξ denotes time or a spatial frequency if ξ denotes depth. The seismic spectrum shown in FIG. 3 represents an ξ-frequency domain characteristic of one voxel in the seismic spectrum volume; different voxels may have differing seismic spectra. Although the ξ-frequency domain may be a temporal-frequency domain obtained by transforming a time domain seismic volume or may be a spatial-frequency obtained by transforming a depth domain seismic volume it shall be referred, without loss of generality, simply as frequency hereafter.

The seismic spectrum (302) of a voxel (208) has a peak value (308) that occurs at a peak frequency (312), denote $f_{peak}$. The magnitude of the peak value (308), denoted $S_{peak}$, is the greatest value of seismic spectrum (302) and may be affected by the depth, or equivalently the recording time, of the voxel (208), by seismic attenuation in the subterranean region above the voxel (208), by the distribution of seismic sources (106) and seismic receivers (116), and by geological structure in the vicinity of the voxel (208).

The seismic spectrum (302) of a voxel may have a threshold (310). The threshold (310) may be based, at least in part, ground motion recorded by seismic receivers (116) caused by sources other than the seismic source (106). Such motion may include anthropogenic vibrations generated by heavy equipment, such as pumps or road traffic, and non-anthropogenic vibrations such as high-winds, and earthquakes. In addition, the threshold may be based, at least in part, on electrical fluctuations, such as those caused by power transmission lines. For frequencies at which the value of the seismic spectrum (302) is smaller than the threshold (310) characterizing the portion of the seismic spectrum (302) produced by the seismic source (106) is difficult.

A maximum frequency (314) may be determined for the seismic spectrum of each voxel (208) and denoted $f_{max}$. In accordance with one or more embodiments, the maximum frequency (314) may be the highest frequency for which the magnitude of the seismic spectrum (302) is larger than the threshold (310). In accordance with other embodiments, the maximum frequency (314) may be the largest frequency at which the value of the seismic spectrum (302) exceeds a predetermined fraction or percentage of the peak value (308). For example, the maximum frequency (314) may be the frequency at which the value of the seismic spectrum (302) exceeds one tenth of the peak value (312). In another example, the maximum frequency (314) may be the frequency at which the magnitude of the seismic spectrum (302) exceeds 3% of the peak value (312)

In accordance with one or more embodiments, the maximum frequency (314) for all the voxels (208) in the seismic spectral volume may be selected to be the same. For example, the maximum frequency may be selected to be 50 Hz for every voxel (208) in the volume. In other embodiments, the maximum frequency may be selected to vary with depth below the surface (110). For example, the maximum frequency may be selected to be 100 Hz at shallow depths, but 30 Hz at greater depths.

In accordance with one or more embodiments, the area under the seismic spectrum (306) between the peak frequency (312) and the maximum frequency (314) may be determined by integrating $S(f,\eta,x)$ between $f_{peak}$ and $f_{max}$:

$$I(\eta,x)=\int_{f_{peak}}^{f_{max}} S(f,\eta,x) df \qquad \text{Equation (2)}$$

In accordance with one or more embodiments, the area (306) under the seismic spectrum (302), denoted $I(\eta,x)$, may be normalized by the product of the difference between the $f_{peak}$ and $f_{max}$ and the peak magnitude of the seismic spectrum (308) denoted, $S_{peak}(\eta,x)$:

$$I_N(\eta,x)=I(\eta,x)/((f_{max}-f_{peak})S_{peak}(\eta,x)). \qquad \text{Equation (3)}$$

In accordance with other embodiments, the area under the seismic spectrum, $I(\eta,x)$, may be normalized by the product of the difference between the $f_{peak}$ and $f_{max}$ and the difference between the peak magnitude of the seismic spectrum, $S_{peak}(\eta,x)$, and the threshold, $S_{noise}(\eta,x)$:

$$I_N(\eta,x)=I(\eta,x)/\{(f_{max}-f_{peak})(S_{peak}(\eta,x)-S_{noise}(\eta,x))\}. \qquad \text{Equation (4)}$$

The normalized area under the seismic spectrum (302) between the peak frequency (312) and the maximum frequency (314), denoted $I_N(\eta,x)$, is independent of the peak value (308) of the seismic spectrum (302) and consequently independent of the factors that influence the peak value (308) described above. Instead, $I_N(\eta,x)$ is an indication of how rapidly the seismic spectrum (302) decays to smaller values at frequencies above the peak frequency (312).

In accordance with one or more embodiments, a seismic attribute, $SA(\eta,x)$, may be determined as a function of $I_N(\eta,x)$ for each voxel, indexed by η and x. The seismic attribute may be a monotonic function of $I_N(\eta,x)$:

$$SA(\eta,x)=\mathcal{F}(I_N(\eta,x)). \qquad \text{Equation (5)}$$

The function $\mathcal{F}$ may include, without limitation, an integral or fractional power, a polynomial, an exponential, a logarithm, or any combination of the preceding components. For example, $SA=I_N$, $SA=1/I_N$, $SA=I_N^{3/2}$, $SA=a\, I_N^2 + b\, I_N$, $SA=\exp I_N$, or $SA=\log I_N$ all fall within the scope of the invention.

Figure 4:
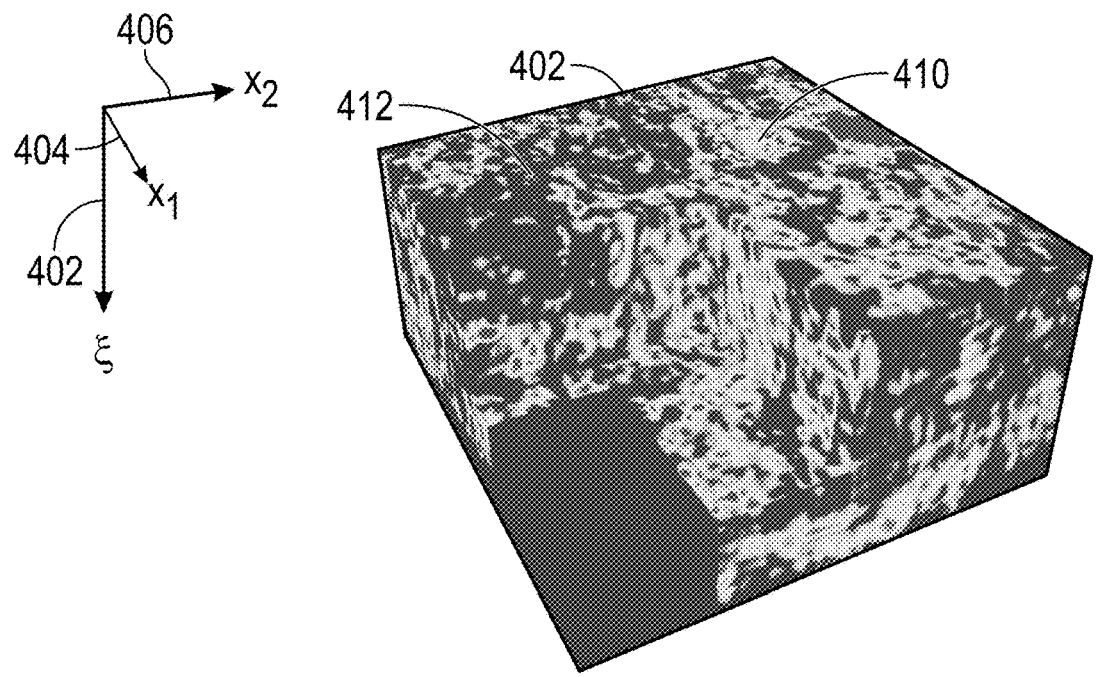
FIG. 4 shows a seismic attribute volume in accordance with one or more embodiments.

FIG. 4 shows a seismic attribute volume (402), in accordance with one or more embodiments. The seismic attribute volume depicted in FIG. 4 may be $SA(\eta,x)$ where $x=(x_1,x_2)$ is the two component vector (404, 406) of a horizontal location, and η (402) may be time in some embodiments, or depth in other embodiments. The value of the seismic attribute volume (402) is indicated by the grayscale (408) with high values of the seismic attribute indicated by light shades and low values indicated by dark shades. The seismic attribute volume (402) contains regions with low values of the seismic attribute (410) and regions with high values of the seismic attribute (412).

In accordance with one or more embodiments, regions of low values of the seismic attribute (410) may indicate portions of the subterranean region of interest (102) which are determined to have a high probability of containing a gas deposit and regions with of high seismic attribute (412) may indicate portions of the subterranean region of interest (102) which are determined have a low probability of containing a gas deposit. In accordance with other embodiments, the interpretation of the high and low values of the seismic attribute may be reversed with high values indicating the presence of gas and low values indicating its absence.

Figure 5:
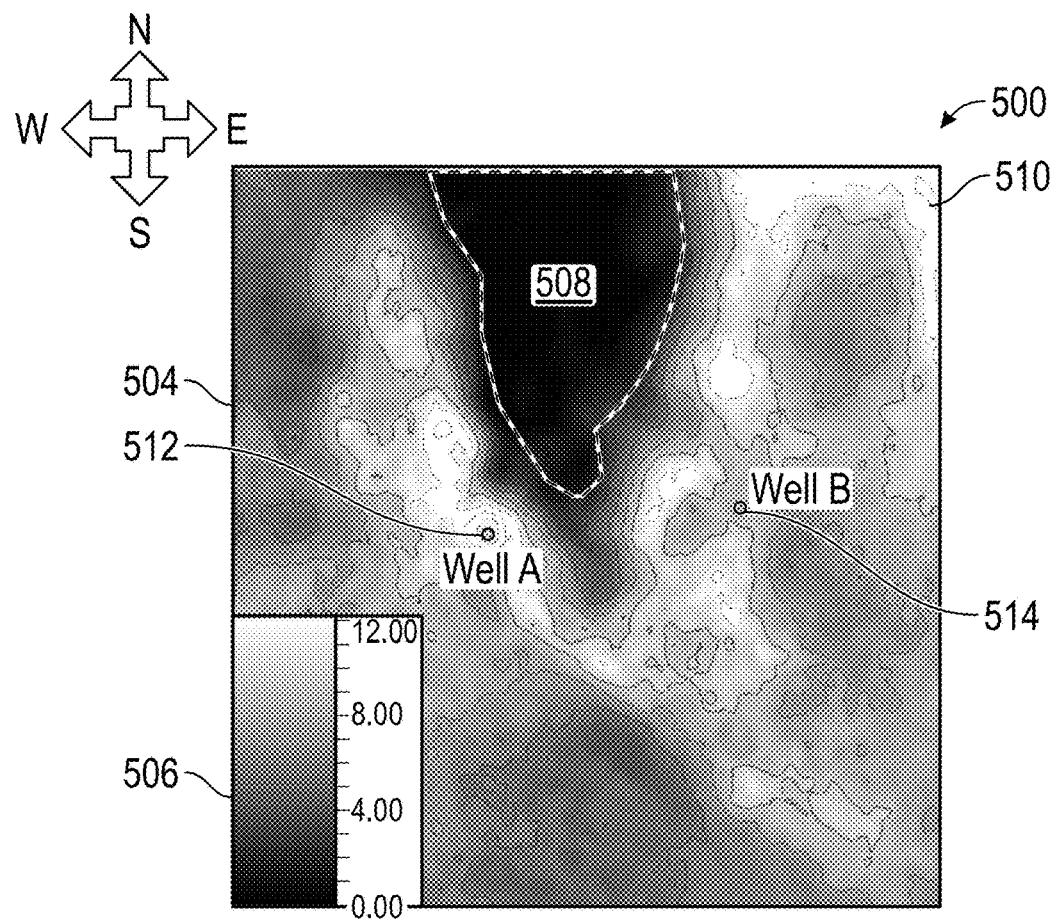
FIG. 5 shows a seismic attribute map in accordance with one or more embodiments.

FIG. 5 shows a map view slice (500) through the seismic attribute volume (402), in accordance with one or more embodiment. A first coordinate axis (502) may be an East-West distance and a second coordinate axis (504) may be a North-South distance, in accordance with one or more embodiments, but other choices of orthogonal coordinate directions may be used. The value of the seismic attribute is encoded in the grayscale (506). FIG. 5 shows regions on low seismic attribute value (508) where gas deposits are not predicted and regions of high seismic attribute value (510) where gas deposits are predicted. In one region of the seismic attribute map (500) where a gas deposit is predicted a Well A (512) has been drilled; Well A produced gas. In another region of the seismic attribute map (500) where a gas deposit is not predicted, a Well B (514) has been drilled; Well B did not produce gas.

Figure 6:
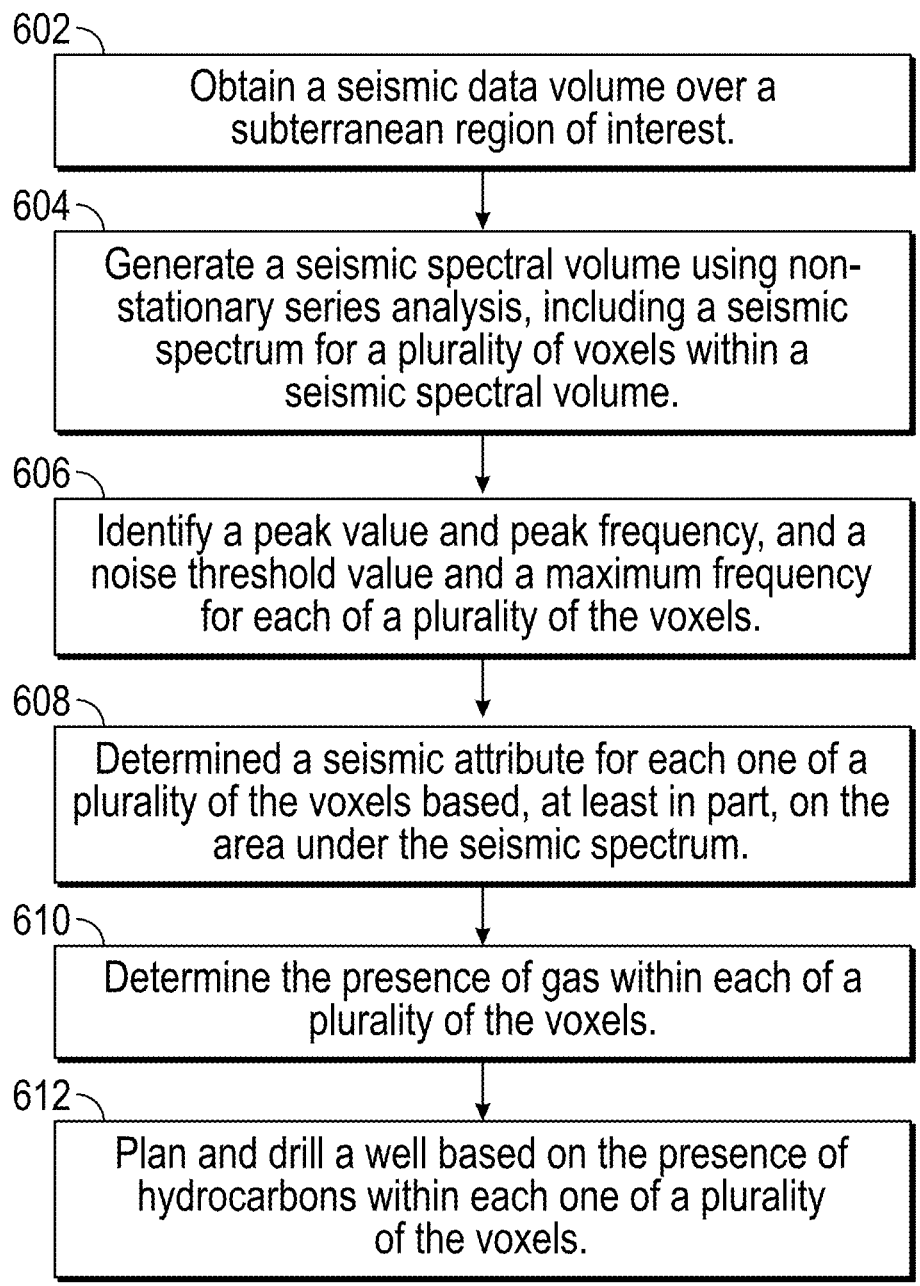
FIG. 6 shows a flowchart in accordance with one or more embodiments.

FIG. 6 shows a flowchart in accordance with one or more embodiments. In Step 602 a seismic data volume (200) is obtained over a subterranean region of interest (102). The seismic data volume (200) may be in the time domain or in the depth domain and may be a pre-stack migrated seismic volume or a post-stack migrated seismic volume.

In Step 604, in accordance with one or more embodiments, the seismic data volume (200) may be transformed into a seismic spectral volume (402) using non-stationary time series analysis if the seismic data volume (200) is in the time domain, or using non-stationary depth series analysis if the seismic data volume (200) is in the depth domain. The seismic spectral volume (402) includes a plurality of voxels. For each voxel a seismic spectrum (302) is determined.

In Step 606, a peak value (308) of the seismic spectrum (302) may be determined, in accordance with one or more embodiments. Furthermore, a threshold value (310) and a maximum frequency (314) of the seismic spectrum (302) may be determined.

In Step 608, a seismic attribute for each one of a plurality of the voxels is determined based, at least in part, on the area (306) under the seismic spectrum (302). In one or more embodiments, the seismic attribute is normalized by a product of the difference between the maximum frequency (314) and the peak frequency (312) and the peak value (308) of the seismic spectrum (302).

In Step 610, the presence of gas within each of a plurality of voxels within the seismic spectral volume may be determined, in accordance with one or more embodiments. The presence of gas may be indicated by a high value of the seismic attribute, in accordance with some embodiments, or by a low value of the seismic attribute in accordance with other embodiments.

In Step 612, a location for drilling a well may be planned. Further, the trajectory of the well may be determined. The location and trajectory of the well may be planned in order to intersect a plurality of voxels in the seismic attribute volume within which a presence of gas is determined.

Figure 7:
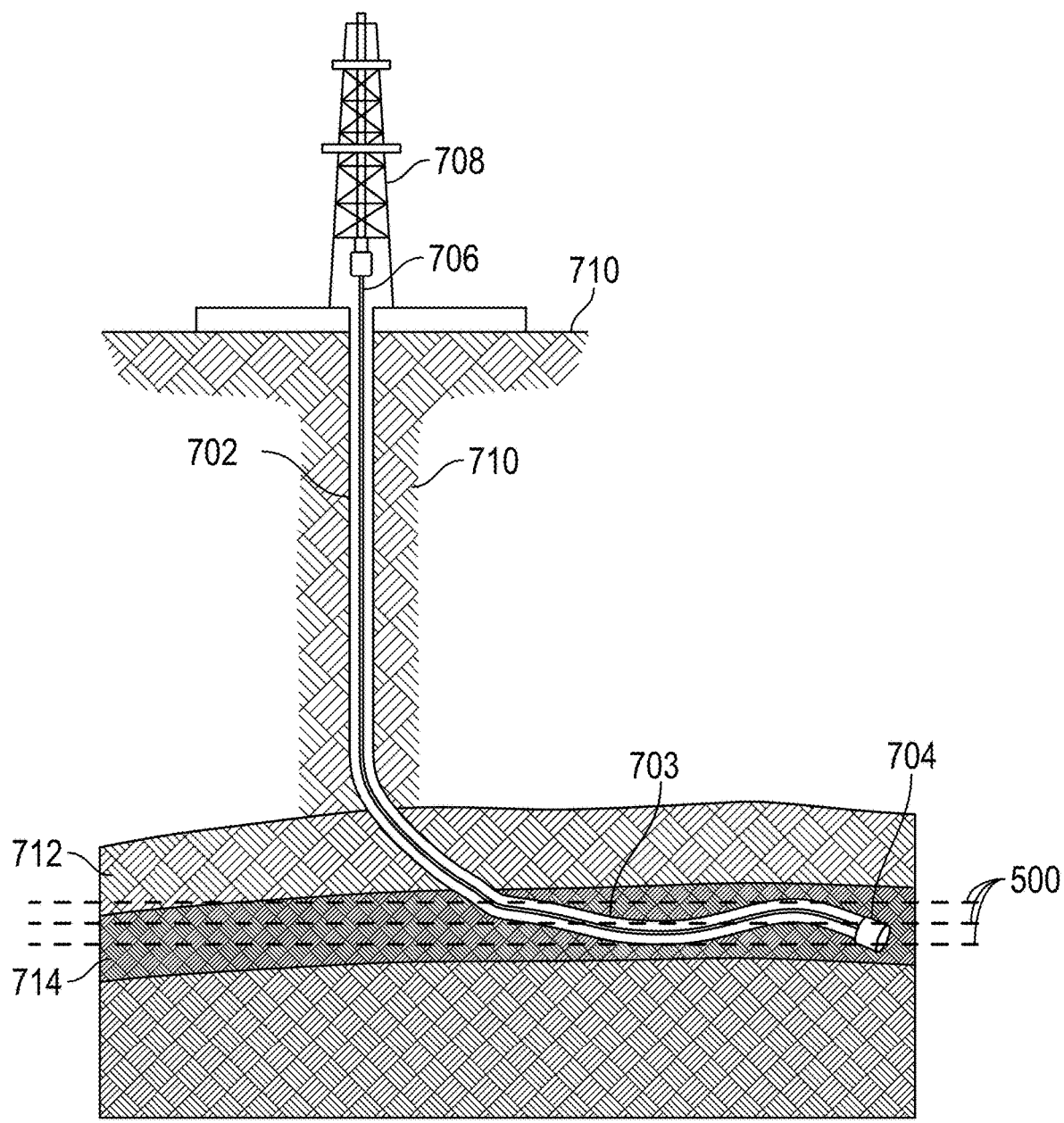
FIG. 7 shows a system in accordance with one or more embodiments.

FIG. 7 illustrates systems in accordance with one or more embodiments. As shown in FIG. 7, a borehole (702) may be drilled by a drill bit (704) attached by a drillstring (706) to a drill rig (708) located on the Earth's surface (110). The borehole may traverse a plurality of overburden layers (710) and one or more cap-rock layers (712) to a hydrocarbon reservoir (714). A seismic attribute map (500) corresponding to at least one depth may be used to plan and perform the curved borehole path (703). A plurality of seismic attribute maps (500) may be used to plan and perform a curve borehole path that intersects a plurality of regions thought to have high probability of containing hydrocarbons.

Figure 8:
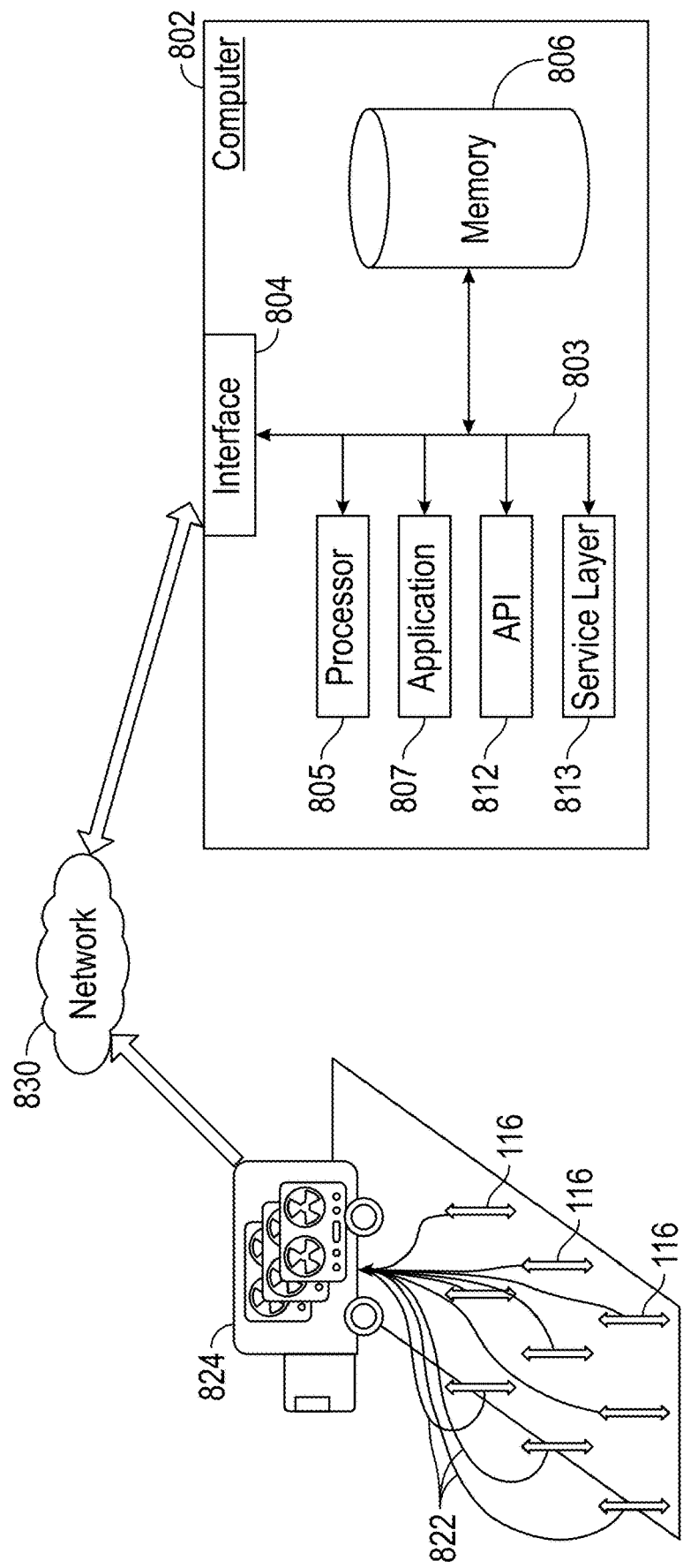
FIG. 8 shows a computer system in accordance with one or more embodiments.

FIG. 8 shows a seismic recording and processing system, in accordance with one or more embodiments. The data recorded by a plurality of multicomponent seismic receivers (116) may be transmitted to a seismic recording facility (824) located in the neighborhood of the seismic survey (100). The seismic recording facility may be one or more seismic recording trucks (824). The plurality of seismic receivers (116) may be in digitally or analogic telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each multicomponent seismic receiver (116), or at the seismic recording facility (824), or at an intermediate telemetry node (not shown) between the multicomponent seismic receiver (116) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing. The computer (802) may be located in or near the seismic recording facility (824) or may be located at a remote location, that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, in which the seismic data is stored from the seismic recording facility (802) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802)

may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U. S. C. § 112(f) for any limitations of any of the claims herein, except for those in which the claim expressly uses the words "means for" or "step for" together with an associated function.

What is claimed is:
1. A method, comprising:
obtaining a seismic data volume for a subterranean region of interest;

transforming, by a computer processor, using a non-stationary series analysis, the seismic data volume into a seismic spectral volume comprising a seismic spectrum for each of a plurality of voxels;

determining, by the computer processor, a seismic attribute volume comprising a seismic attribute for each of the plurality of voxels,
  wherein the seismic attribute for each voxel of the plurality of voxels is based on an integral of the seismic spectrum for the voxel over a range bounded by a first frequency and a second frequency, and
  wherein the second frequency is based, at least in part, on ground motion caused by a source other than the seismic source; and determining, by the computer processor, a presence of hydrocarbon in the subterranean region of interest based on the seismic attribute volume.

2. The method of claim 1, further comprising:
  determining, by the computer processor, a well path through the subterranean region of interest based, at least in part, on the seismic attribute volume; and
  performing the well path using a drilling system.

3. The method of claim 2, wherein determining a well path through the subterranean region of interest comprises planning a well path that traverses a set of voxels from the plurality of voxels, wherein each member of the set of voxels has an absolute value of the seismic attribute exceeding a predetermined value.

4. The method of claim 1,
  wherein the first frequency is selected based, at least in part, on a peak amplitude of the seismic spectrum.

5. The method of claim 1, wherein the seismic attribute is based, at least in part, on a quotient obtained by dividing an integral of the seismic spectrum over the range by a normalization factor based, at least in part, on an amplitude of the seismic spectrum.

6. The method of claim 5, wherein the normalization factor is a product of a difference between the first frequency and the second frequency and a difference between a seismic spectral value at the first frequency and a seismic spectral value at the second frequency.

7. The method of claim 1, wherein the seismic data volume is a pre-stack time migration data volume or a post-stack time migration data volume.

8. The method of claim 1, wherein the seismic data volume comprises a time-domain seismic data volume with a time dimension and a spatial dimension.

9. A non-transitory computer-readable medium storing instructions that, when executed by a computer processor, cause the computer processor to perform steps comprising:
  obtaining a seismic data volume for a subterranean region of interest;
  transforming, using a non-stationary series analysis, the seismic data volume into a seismic spectral volume comprising a seismic spectrum for each of the plurality of voxels;
  determining a seismic attribute volume comprising a seismic attribute for each of the plurality of voxels,
    wherein the seismic attribute for a voxel of the plurality of voxels is based, at least in part, on an integral of the seismic spectrum for the voxel over a range bounded by a first frequency and a second frequency, and
    wherein the second frequency is based, at least in part, on ground motion caused by a source other than the seismic source; and
  determining, a presence of hydrocarbon in the subterranean region of interest based on the seismic attribute volume.

10. The non-transitory computer readable medium of claim 9, wherein the steps further comprise determining a well path through the subterranean region of interest based, at least in part, on the seismic attribute volume.

11. The non-transitory computer readable medium of claim 10,
  wherein determining a well path through the subterranean region of interest comprises planning a well path that traverses at a set of voxels,
  wherein each member of the set of voxels has an absolute value of the seismic attribute exceeding a predetermined value.

12. The non-transitory computer readable medium of claim 9, wherein the first frequency is selected based, at least in part, on a peak amplitude of the seismic spectrum.

13. The non-transitory computer readable medium of claim 9, wherein the seismic attribute is based, at least in part, on a quotient obtained by dividing an integral of the seismic spectrum over the range by a normalization factor based, at least in part, on an amplitude of the seismic spectrum.

14. The non-transitory computer readable medium of claim 13, wherein the normalization factor is a product of a difference between the first frequency and the second frequency and a difference between a seismic spectral value at the first frequency and a seismic spectral value at the second frequency.

15. The non-transitory computer readable medium of claim 9, wherein the seismic data volume is a pre-stack time migration data volume or a post-stack time migration data volume.

16. The non-transitory computer readable medium of claim 9, wherein the seismic data volume comprises a time-domain seismic data volume with a time dimension and a spatial dimension.

17. A system for determining the presence of hydrocarbon, comprising:
  a seismic source to emit a radiated seismic wave;
  a plurality of seismic receivers for detecting and recording a multi-dimensional seismic data set generated by the radiated seismic wave; and
  a seismic processor configured to:
    obtaining a seismic data volume for a subterranean region of interest;
    transforming, using a non-stationary series analysis, the seismic data volume into a seismic spectral volume comprising a seismic spectrum for each of the plurality of voxels;
    determining a seismic attribute volume comprising a seismic attribute for each of the plurality of voxels,
      wherein the seismic attribute for a voxel of the plurality of voxels is based, at least in part, on an integral of the seismic spectrum for the voxel over a range bounded by a first frequency and a second frequency, and
      wherein the second frequency is based, at least in part, on ground motion caused by a source other than the seismic source; and
    determining, a presence of hydrocarbon in the subterranean region of interest based on the seismic attribute volume.

18. The system for determining the presence of hydrocarbon of claim 17, wherein the first frequency is selected based, at least in part, on a peak amplitude of the seismic spectrum.

19. The system for determining the presence of hydrocarbon of claim 17, wherein the seismic attribute is based, at least in part, on a quotient obtained by dividing an integral of the seismic spectrum over the range by a normalization factor based, at least in part, on an amplitude of the seismic spectrum.

20. The system for determining the presence of hydrocarbon of claim 19, wherein the normalization factor is a product of a difference between the first frequency and the second frequency and a difference between a seismic spectral value at the first frequency and a seismic spectral value at the second frequency.

* * * * *